(12) United States Patent
Moore

(10) Patent No.: US 10,627,826 B2
(45) Date of Patent: Apr. 21, 2020

(54) SYSTEMS AND METHODS FOR PAIRING A POWER BASE OF A MODULAR WHEELCHAIR SYSTEM WITH A GUIDE ROBOT

(71) Applicant: Toyota Motor Engineering & Manufacturing North America, Inc., Plano, TX (US)

(72) Inventor: Douglas A. Moore, Fairview, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 93 days.

(21) Appl. No.: 15/937,083

(22) Filed: Mar. 27, 2018

(65) Prior Publication Data
US 2019/0302786 A1 Oct. 3, 2019

(51) Int. Cl.
| G05D 1/02 | (2020.01) |
| A61G 5/04 | (2013.01) |
| A61G 5/10 | (2006.01) |
| G05D 1/00 | (2006.01) |
| B25J 19/02 | (2006.01) |

(52) U.S. Cl.
CPC ............ *G05D 1/0225* (2013.01); *A61G 5/04* (2013.01); *A61G 5/10* (2013.01); *G05D 1/0088* (2013.01); *A61G 2203/14* (2013.01); *G05D 2201/0206* (2013.01); *Y10S 901/01* (2013.01); *Y10S 901/46* (2013.01); *Y10S 901/47* (2013.01)

(58) Field of Classification Search
USPC .......................................... 701/23
See application file for complete search history.

(56) References Cited

U.S. PATENT DOCUMENTS

| 8,073,585 B2* | 12/2011 | Jaenke | A61G 5/04 |
| | | | 701/31.6 |
| 2004/0084230 A1* | 5/2004 | Grymko | A61G 5/042 |
| | | | 180/65.1 |
| 2016/0213535 A1* | 7/2016 | Maither | A61G 5/14 |
| 2017/0056262 A1 | 3/2017 | Yamada et al. | |
| 2017/0095382 A1 | 4/2017 | Yamada et al. | |
| 2018/0014988 A1* | 1/2018 | Diaz-Flores | A61G 5/023 |
| 2018/0256422 A1* | 9/2018 | Leaman | A61G 5/1051 |
| 2019/0228465 A1* | 7/2019 | Moore | G06Q 30/0645 |

FOREIGN PATENT DOCUMENTS

| CN | 105816282 A | 8/2016 |
| CN | 106580587 A | 4/2017 |

* cited by examiner

*Primary Examiner* — Tyler D Paige
(74) *Attorney, Agent, or Firm* — Dinsmore & Shohl LLP

(57) ABSTRACT

A system includes a modular wheelchair system and a guide robot. The modular wheelchair system includes an upper component, and a power base configured to detachably couple to the upper component. The guide robot is communicatively coupled to the power base and configured to provide navigation data to the power base. The guide robot identifies the power base, determines whether the upper component is detached from the power base, pairs with the power base in response to determination that the upper component is detached from the power base, and implements coordinated movement with the power base to transfer the power base to a predetermined area.

20 Claims, 7 Drawing Sheets

SYSTEMS AND METHODS FOR PAIRING A POWER BASE OF A MODULAR WHEELCHAIR SYSTEM WITH A GUIDE ROBOT

TECHNICAL FIELD

The present specification generally relates to modular wheelchair systems and, more specifically, to systems and methods for paring a power base of a modular wheelchair system with a guide robot.

BACKGROUND

Conventional wheelchairs are voluminous and need to be placed in a storage area when a user of the wheelchair takes another transportation (e.g., vehicles, airplanes, etc.). The user may need another person's help to place the wheelchair in a storage area.

Accordingly, a need exists for a wheelchair system that a user can use without another person's help.

SUMMARY

In one embodiment, a system includes a modular wheelchair system and a guide robot. The modular wheelchair system includes an upper component, and a power base configured to detachably couple to the upper component. The guide robot is communicatively coupled to the power base and configured to provide navigation data to the power base.

In another embodiment, a guide robot includes one or more processors, one or more memory modules, and machine readable instructions stored in the one or more memory modules that, when executed by the one or more processors, cause the guide robot to: pair with a power base of a modular wheelchair system, and transmit navigation data to the power base of the modular wheelchair system.

In yet another embodiment, a method for pairing a power base of a modular wheelchair system with a guide robot includes identifying, by a guide robot, a power base of a modular wheelchair system, pairing the guide robot with the identified power base, and transmitting navigation data from the guide robot to the identified power base.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments described herein are directed to a system that includes a modular wheelchair system and a guide robot. The modular wheelchair system includes an upper component, and a power base configured to detachably couple to the upper component. The guide robot is communicatively coupled to the power base and configured to provide navigation data to the power base. With the present system, the user of the modular wheelchair system may continue to use the chair component of the modular wheelchair system. The power base of the wheelchair system may be delivered to a predetermined area (e.g., a storage area) by the guide robot, such that the user does not need help from another person to carry the power base. In addition, because the guide robot automatically guides the power base to a certain area, the power base virtually drives autonomously even without sensors and processing algorithm for autonomous driving.

Figure 1:
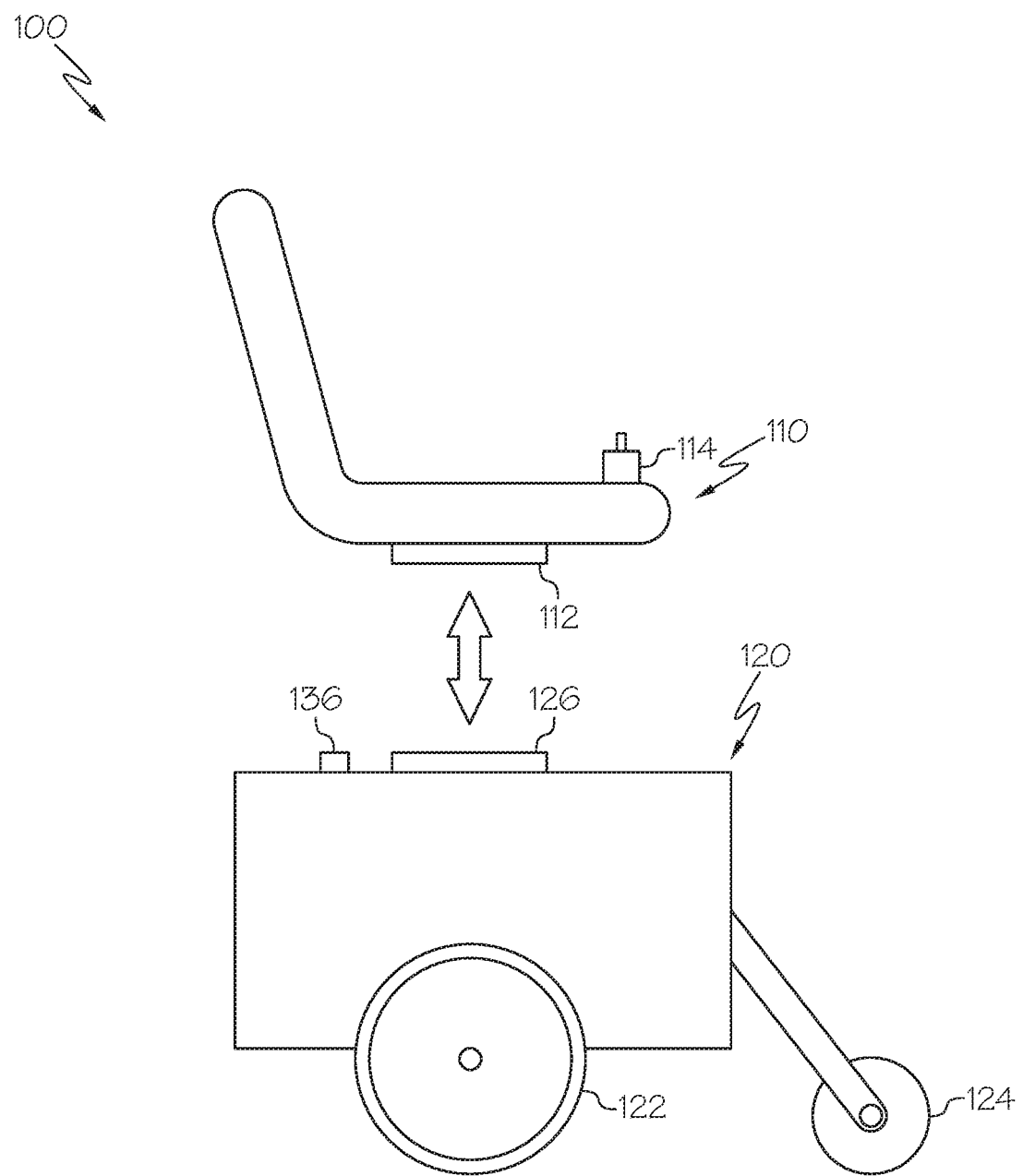
FIG. 1 depicts a modular wheelchair system according to one or more embodiments shown and described herein.

Referring now to FIG. 1, one embodiment of a modular wheelchair system 100 is described. The modular wheelchair system 100 includes an upper component 110 and a power base 120. In embodiments, the upper component 110 may be a chair configured to support a user of the modular wheelchair system 100. The chair may be a customized chair for the user. In some embodiments, the upper component 110 may be a component configured to support an object, for example, a tray for carrying food, a plate for carrying parcels, etc. The upper component 110 may include a user interface 114 and a coupling mechanism 112. The user interface 114 may be an input device configured to receive instructions from a user for moving the modular wheelchair system 100. For example, the user interface 114 may be a joystick which the user can manipulate to operate the modular wheelchair system 100. The user may control the moving direction and speed of the power base 120 by manipulating the joystick. The user interface 114 may be communicatively coupled to the power base 120 in order to send instructions to the power base 120, which will be described below with reference to FIG. 3.

The power base 120 may include one or more main wheels 122 and one or more assistance wheels 124. In some embodiments, the power base 120 may not include one or more assistance wheels 124. In some embodiments, the power base 120 may have self-balancing functions based on yaw, pitch and/or roll data obtained by sensors, for example, gyroscope sensors, accelerometers, etc.

The power base 120 may include a coupling mechanism 126 configured to couple with the coupling mechanism 112 of the upper component 110. The coupling mechanism 126 and the coupling mechanism 112 may be any mechanical coupling mechanism that couples the power base 120 with the upper component 110. For example, the coupling mechanism 126 may be a female coupling section and the coupling mechanism 112 may be a male coupling section that may be coupled to the female coupling section, or vice versa. In some embodiments, the coupling mechanism 126 and the coupling mechanism 112 are magnetic components that attract each other to couple.

The power base 120 includes a coupling detection sensor 136. The coupling detection sensor 136 detects whether the upper component 110 is coupled to the power base 120. In some embodiments, the power base 120 may not include the coupling detection sensor 136. The details of the coupling detection sensor 136 will be described in detail with reference to FIG. 3 below.

Figure 2:
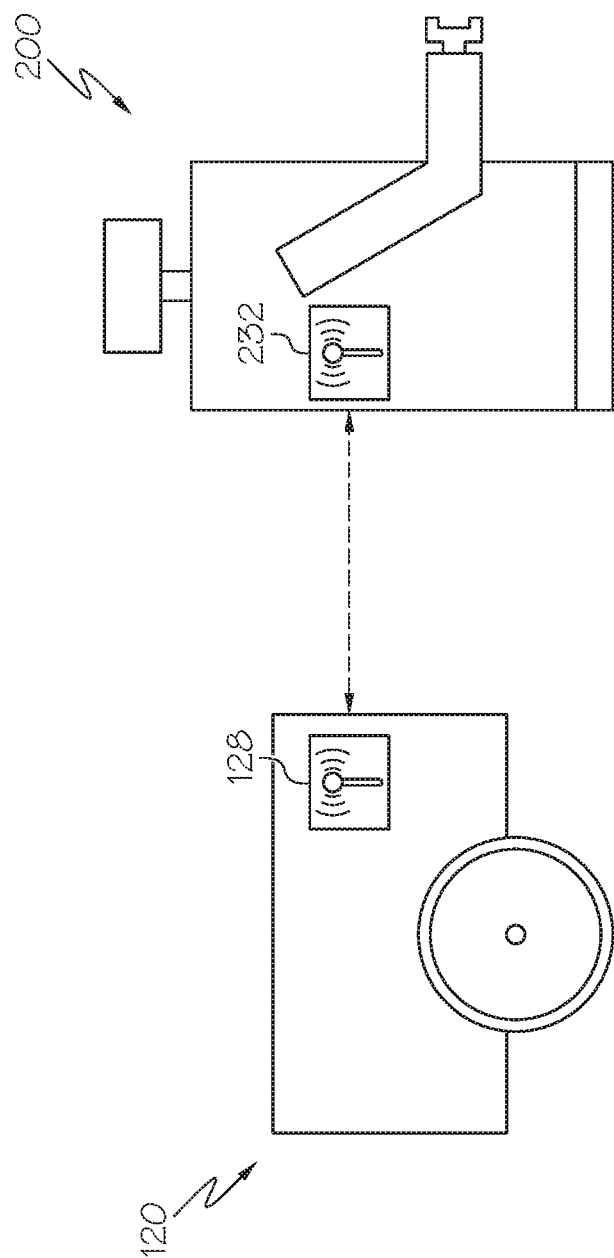
FIG. 2 depicts a guide robot pairing with the power base of the modular wheelchair, according to one or more embodiments shown and described herein.

FIG. 2 schematically depicts pairing the power base 120 paired with a guide robot 200, according to one or more embodiments shown and described herein. Pairing of the power base 120 and the guide robot 200 means a communicative coupling of the power base 120 and the guide robot 200 such that the guide robot 200 and the power base 120 may implement a coordinated movement. For example, the power base 120 and the guide robot 200 may move in a synchronized manner by communicating with each other (e.g., moving in the same direction at the same speed). In embodiments, the guide robot 200 may identify the power base 120 and pair with the power base 120 by communicating with the power base 120. A network interface hardware 128 of the power base 120 may be communicatively coupled to a network interface hardware 232 of the guide robot 200. For example, the network interface hardware 232 of the guide robot 200 may transmit wireless signals via, for example, Wi-Fi, Bluetooth, Near Field Communication (NFC) and the like. The network interface hardware 232 of the guide robot 200 may send instructions for operating the power base 120 to the network interface hardware 128 of the power base 120. For example, the network interface hardware 232 may send instructions for moving direction and moving speed of the power base 120. In some embodiments, the power base 120 may be physically coupled to the guide robot 200, and the guide robot 200 may carry the power base 120 to a predetermined location. For example, the power base 120 may be mechanically coupled to the guide robot 200 based on any mechanical coupling mechanism as discussed above with respect to coupling mechanisms 112 and 126.

Figure 3:
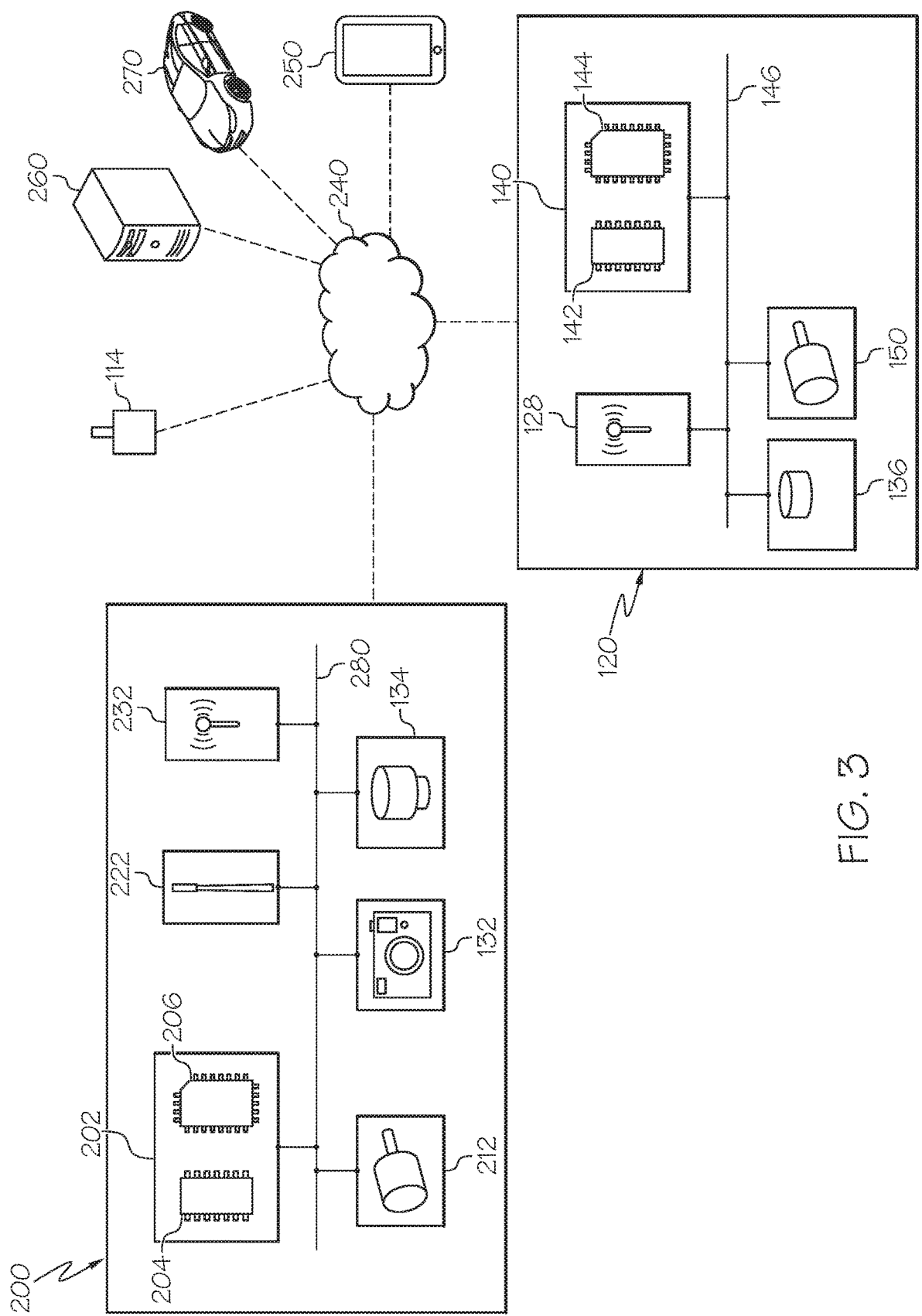
FIG. 3 schematically depicts a guide robot and the power base of the modular wheelchair, according to one or more embodiments shown and described herein.

FIG. 3 schematically depicts a guide robot 200 and a power base 120, according to one or more embodiments shown and described herein. The guide robot 200 includes a controller 202 that includes one or more processors 204 and one or more memory modules 206. Each of the one or more processors 204 may be any device capable of executing machine readable and executable instructions. Accordingly, each of the one or more processors 204 may be a controller, an integrated circuit, a microchip, a computer, or any other computing device. The one or more processors 204 are coupled to a communication path 280 that provides signal interconnectivity between various modules of the guide robot 200. Accordingly, the communication path 280 may communicatively couple any number of processors 204 with one another, and allow the modules coupled to the communication path 280 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 280 may be formed from any medium that is capable of transmitting a signal such as, for example, conductive wires, conductive traces, optical waveguides, or the like. In some embodiments, the communication path 280 may facilitate the transmission of wireless signals, such as Wi-Fi, Bluetooth, Near Field Communication (NFC) and the like. Moreover, the communication path 280 may be formed from a combination of mediums capable of transmitting signals. In one embodiment, the communication path 280 comprises a combination of conductive traces, conductive wires, connectors, and buses that cooperate to permit the transmission of electrical data signals to components such as processors, memories, sensors, input devices, output devices, and communication devices. Accordingly, the communication path 280 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 206 are coupled to the communication path 280. The one or more memory modules 206 may comprise RAM, ROM, flash memories, hard drives, or any device capable of storing machine readable and executable instructions such that the machine readable and executable instructions can be accessed by the one or more processors 204. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring to FIG. 3, the guide robot 200 includes one or more electric motors 212 that are coupled to the communication path 280. The one or more electric motors 212 are connected to the one or more main wheels placed at the bottom of the guide robot 200 and provide torque to the one or more main wheels. The one or more electric motors 212 are coupled to the communication path 280 and receive instructions from the controller 202. For example, the controller 202 may control the rotation speed and rotation direction of the one or more electric motors 212.

Referring still to FIG. 3, the guide robot 200 includes one or more cameras 132. The one or more cameras 132 may be any device having an array of sensing devices (e.g., pixels) capable of detecting radiation in an ultraviolet wavelength band, a visible light wavelength band, or an infrared wavelength band. The one or more cameras 132 may have any resolution. The one or more cameras 132 may include an omni-directional camera, or a panoramic camera.

The one or more cameras 132 are coupled to the communication path 280 and communicate with other components of the guide robot 200. The one or more cameras 132 may capture images of environment external to the guide robot 200. The one or more memory modules 206 may include instructions for processing images received from one or more cameras 132. For example, the one or more processors 204 implement the instructions in the one or more memory modules 206 to process an image from the one or more cameras 132 to identify objects in the image. In some embodiments, the one or more processors may compare the image with a sample image for a certain object stored in the one or more memory modules 206. For example, the guide robot 200 may capture an image of an object and compare the image with a sample image for a power base. If the capture image matches with the sample image for a power base, the guide robot 200 identifies the object as a power base. Any image processing technology may be used to process images from the one or more cameras 132. In some embodiments, based on the identified objects, the controller 202 may control the orientation and speed of the guide robot 200, for example, by controlling the one or more electric motors 212 to drive the guide robot 200.

Referring still to FIG. 3, the one or more proximity sensors 134 are coupled to the communication path 280. The one or more proximity sensors 134 detect a distance between the one or more proximity sensors 134 and an object nearby and communicate the proximity information to the controller 202 of the guide robot 200. The one or more proximity sensors 134 may be any device capable of outputting a proximity signal indicative of the proximity of an object to the one or more proximity sensors 134. In some embodiments, the one or more proximity sensors 134 may include laser scanners, capacitive displacement sensors, Doppler Effect sensors, eddy-current sensors, ultrasonic sensors, magnetic sensors, optical sensors, radar sensors, sonar sensors, LIDAR sensors or the like. Some embodiments may not include the one or more proximity sensors 134. In some embodiments, the guide robot 200 may be configured to determine the presence of an obstacle proximate to the guide robot 200 based on a signal from the one or more proximity sensors 134. Based on the identified obstacle, the controller 202 may control the orientation and speed of the guide robot 200, for example, by controlling the one or more electric motors 212 to drive the guide robot 200.

Referring still to FIG. 3, the guide robot 200 includes a satellite antenna 222 coupled to the communication path 280 such that the communication path 280 communicatively couples the satellite antenna 222 to other modules of the guide robot 200. The satellite antenna 222 is configured to receive signals from global positioning system satellites. Specifically, in one embodiment, the satellite antenna 222 includes one or more conductive elements that interact with electromagnetic signals transmitted by global positioning system satellites. The received signal is transformed into a data signal indicative of the location (e.g., latitude and longitude) of the satellite antenna 222 or an object positioned near the satellite antenna 222, by the one or more processors 204. The data signal may be used to determine the location of the guide robot 200 relative to other objects such as the upper component 110, the power base 120, etc. In some embodiments, the guide robot 200 may not include the satellite antenna 222.

The guide robot 200 includes the network interface hardware 232 for communicatively coupling the guide robot 200 with the power base 120, a mobile device 250, a remote server 260, a vehicle 270, or the user interface 114 of the upper component 110. The network interface hardware 232 is coupled to the communication path 280 such that the communication path 280 communicatively couples the network interface hardware 232 to other modules of the guide robot 200. The network interface hardware 232 may be any device capable of transmitting and/or receiving data via a wireless network. Accordingly, the network interface hardware 232 may include a communication transceiver for sending and/or receiving data according to any wireless communication standard. For example, the network interface hardware 232 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 232 includes a Bluetooth transceiver that enables the guide robot 200 to exchange information with the mobile device 250 (e.g., a smartphone) via Bluetooth communication.

The power base 120 includes a controller 140 that includes one or more processors 142 and one or more memory modules 144. Each of the one or more processors 142 may be any device capable of executing machine readable and executable instructions. Accordingly, each of the one or more processors 142 may be a controller, an integrated circuit, a microchip, a computer, or any other computing device. The one or more processors 142 are coupled to a communication path 146 that provides signal interconnectivity between various modules of the power base 120. Accordingly, the communication path 146 may communicatively couple any number of processors 142 with one another, and allow the modules coupled to the communication path 146 to operate in a distributed computing environment.

The communication path 146 may be formed from any medium that is capable of transmitting a signal such as, for example, conductive wires, conductive traces, optical waveguides, or the like. In some embodiments, the communication path 146 may facilitate the transmission of wireless signals, such as Wi-Fi, Bluetooth, Near Field Communication (NFC) and the like. Moreover, the communication path 146 may be formed from a combination of mediums capable of transmitting signals. In one embodiment, the communication path 146 comprises a combination of conductive traces, conductive wires, connectors, and buses that cooperate to permit the transmission of electrical data signals to components such as processors, memories, sensors, input devices, output devices, and communication devices. Accordingly, the communication path 146 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 144 are coupled to the communication path 146. The one or more memory modules 144 may comprise RAM, ROM, flash memories, hard drives, or any device capable of storing machine readable and executable instructions such that the machine readable and executable instructions can be accessed by the one or more processors 142. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 144. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The power base 120 includes a coupling detection sensor 136. The coupling detection sensor 136 is coupled to the communication path 146. In embodiments, the coupling detection sensor 136 may be a proximity sensor that detects a distance between the coupling detection sensor 136 and the upper component 110 in FIG. 1 and communicates the proximity information to the controller 140 of the power base 120. In some embodiments, the coupling detection sensor 136 may be a weight sensor that measures a weight of an object on the power base 120. The one or more memory modules 144 may include instructions for determining whether a detachment event occurs based on data from the coupling detection sensor. For example, in some embodiments, the controller 140 continues to receive distance information from the coupling detection sensor 136 that detects a distance between the coupling detection sensor 136 and the upper component 110, and if the distance becomes greater than a threshold value, then the controller 140 determines that a detachment event occurred. As another example, the controller 140 continues to receive weight information from the weight sensor that measures a weight of an object on the power base 120, and if the weight becomes less than a threshold value, then the controller 140 determines that a detachment event occurred. Once the controller 140 determines that a detachment event occurred, the controller 140 may transmit a signal indicating the detachment event to the guide robot 200. In response to the signal indicating the detachment event, the guide robot 200 may initiate coupling with the power base 120.

The power base 120 includes one or more electric motors 150 that are coupled to the communication path 146. The one or more electric motors 150 are connected to the one or more main wheels 122 shown in FIG. 1 and provide torque to the one or more main wheels 122. The one or more electric motors 150 are coupled to the communication path 146 and receive instructions from the controller 140. For example, the controller 140 may control the rotation speed and rotation direction of the one or more electric motors 150. The power base 120 may receive instructions for moving direction and speed of the power base 120 from the guide robot 200 and control the rotation speed and rotation direction of the one or more electric motors 150 based on the instructions for moving direction and speed of the power base 120.

Still referring to FIG. 3, data from various applications running on the mobile device 250 may be provided from the mobile device 250 to the guide robot 200 via the network interface hardware 232. The mobile device 250 may be any device having hardware (e.g., chipsets, processors, memory, etc.) for communicatively coupling with the network interface hardware 232 and the network 240. Specifically, the mobile device 250 may include an antenna for communicating over one or more of the wireless computer networks described above. Moreover, the mobile device 250 may include a mobile antenna for communicating with the network 240. Accordingly, the mobile antenna may be configured to send and receive data according to a mobile telecommunication standard of any generation (e.g., 1G, 2G, 3G, 4G, 5G, etc.). Specific examples of the mobile device 250 include, but are not limited to, smart phones, tablet devices, e-readers, laptop computers, or the like. In embodiments, the mobile device 250 may include software applications for controlling the guide robot 200. For example, a software application may send an instruction to the guide robot 200 that instructs the guide robot 200 to drive to the current location of the mobile device 250. The software application may send the current location of the mobile device 250 to the guide robot 200. As another example, a software application may send an instruction to the guide robot 200 to locate the power base 120 and couple with the power base 120.

The network 240 generally includes a plurality of base stations that are configured to receive and transmit data according to mobile telecommunication standards. The base stations are further configured to receive and transmit data over wired systems such as public switched telephone network (PSTN) and backhaul networks. The network 240 may further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Accordingly, the network 240 may be utilized as a wireless access point by the network interface hardware 232 or the mobile device 250 to access one or more servers (e.g., a server 260). The server 260 generally includes processors, memory, and chipset for delivering resources via the network 240. Resources may include providing, for example, processing, storage, software, and information from the server 260 to the guide robot 200 via the network 240. In some embodiments, the server 260 may include autonomous driving algorithms for the guide robot 200 such that the guide robot 200 may drive autonomously by communicating with the server 260. In some embodiments, the guide robot 200 may receive data that is used for autonomous driving. For example, the guide robot 200 may receive map data from the remote server 260 based on the current location of the guide robot 200. As another example, the guide robot 200 may transmit raw data obtained by the one or more cameras 132 and the one or more proximity sensors 134 to the remote server 260, receive processed data from the remote server 260, and implement autonomous driving based on the processed data received from the remote server 260. It should be understood that the network interface hardware 232 may be communicatively coupled to any number of servers by way of the network 240.

The network interface hardware 232 may be communicatively coupled to the network 240 and may communicate with the user interface 114 of the upper component via the network 240. In embodiments, the power base 120 may receive operation instructions from the user interface 114 and control the one or more electric motors 150 to drive the power base 120 based on the operation instructions. In another embodiment, the guide robot 200 may receive operation instructions from the user interface 114 and control the one or more electric motors 212 to drive the guide robot 200 based on the operation instructions. For example, the user interface 114 may include a pair of buttons for selecting one of the power base 120 and the guide robot 200 to communicate with. If the button for selecting the power base 120 is activated, the user interface 114 may communicate with the power base 120. If the button for selecting the guide robot 200 is activated, the user interface 114 may communicate with the guide robot 200.

Figure 4:
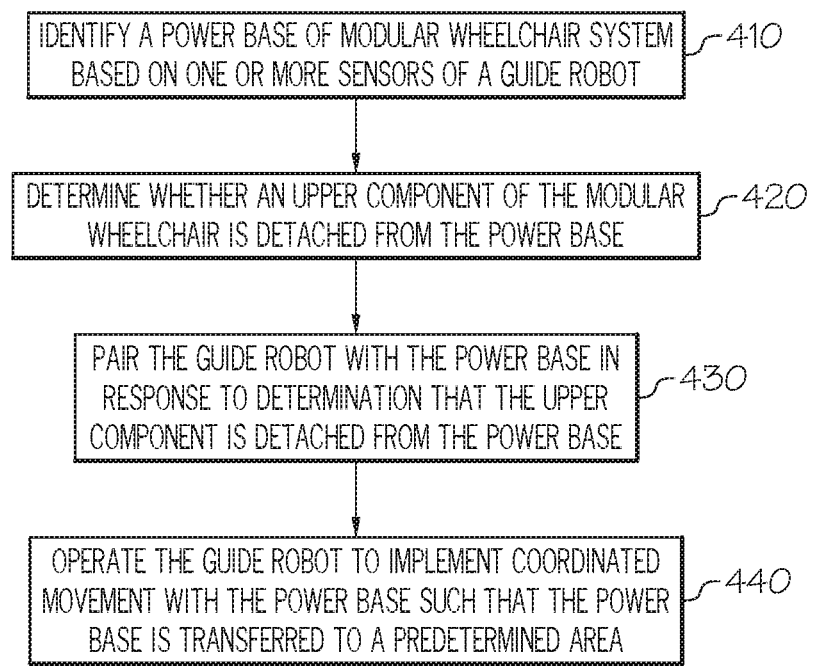
FIG. 4 depicts a flowchart for pairing a guide robot with the power base of the modular wheelchair, according to one or more embodiments shown and described herein.
Figure 5A:
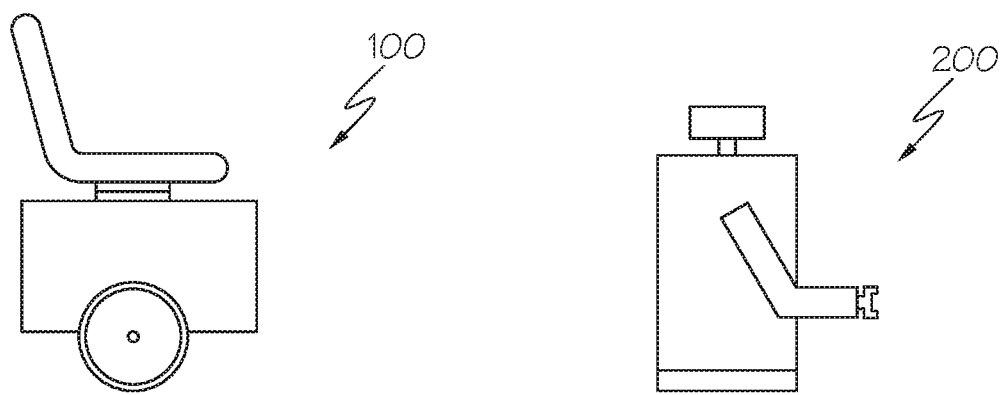
FIG. 5A depicts interaction between a guide robot with the power base of the modular wheelchair, according to one or more embodiments shown and described herein.

FIG. 4 depicts a flowchart for implementing coordinated movement of a guide robot and a power base, according to one or more embodiments shown and described herein. In step 410, the guide robot 200 identifies the power base 120 of the modular wheelchair system 100 based on one or more sensors of the guide robot 200. In embodiments, the guide robot 200 may identify the power base 120 of the modular wheelchair system 100 based on one or more cameras 132 and/or one or more proximity sensors 134. For example, as shown in FIG. 5A, the guide robot 200 may capture an image of the modular wheelchair system 100 and compare the image with a sample image for a power base. If a portion of the capture image matches with the sample image for a power base, the guide robot 200 identifies the portion as a power base. In another embodiment, the guide robot 200 may identify the power base 120 by receiving wireless signals transmitted from the network interface hardware 128 of the power base 120.

Figure 5B:
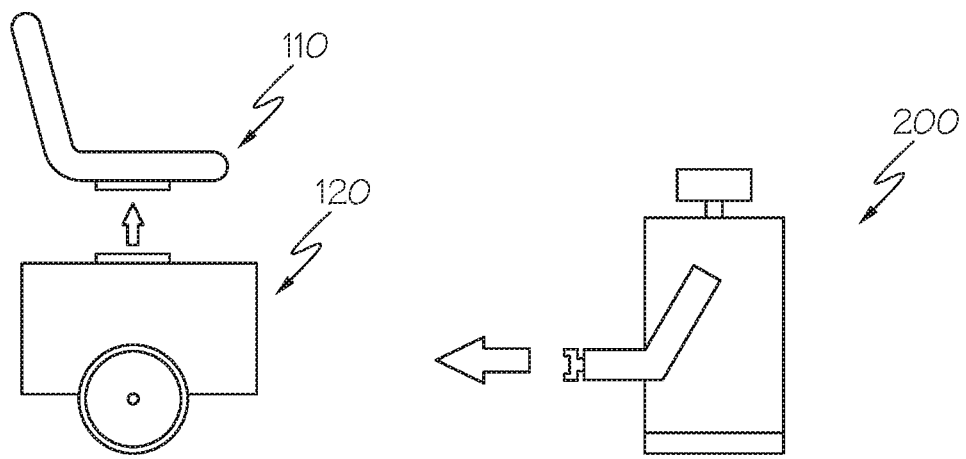
FIG. 5B depicts interaction between a guide robot with the power base of the modular wheelchair, according to one or more embodiments shown and described herein.

In step 420, the guide robot 200 determines whether an upper component of the modular wheelchair system is detached from the power base. In embodiments, the guide robot 200 may determine whether the upper component 110 of the modular wheelchair system 100 is detached from the power base 120 by capturing an image of the modular wheelchair system 100 and processing the image. If the processed image shows the power base 120 without the upper component 110, the guide robot 200 may determine that the upper component 110 is detached from the power base 120. In another embodiment, as shown in FIG. 5B, the power base 120 may detect the detachment of the upper component 110 from the power base 120 based on the coupling detection sensor 136 and transmit a signal indicating the detachment event to the guide robot 200. The power base 120 may determine that the upper component 110 of the modular wheelchair system 100 is detached from the power base 120 based on the signal from the power base 120.

In step 430, the guide robot 200 is paired with the power base 120 in response to determination that the upper component 110 is detached from the power base 120. In embodiments, the network interface hardware 232 communicates with the network interface hardware 128 of the power base 120 and synchronizes movements of the guide robot 200 and the power base 120. For example, the controller 202 of the guide robot 200 transmits operation instructions to both the one or more electric motors 212 of the guide robot 200 and the one or more electric motors 150 of the power base 120, such that the guide robot 200 and the power base 120 move in the same direction at the same speed. The distance between the guide robot 200 and the power base 120 may be maintained. For example, as shown in FIG. 5C, the distance between the guide robot 200 and the power base 120 may be maintained as a distance d when the guide robot 200 and the power base 120 are paired and moving together.

Figure 5C:
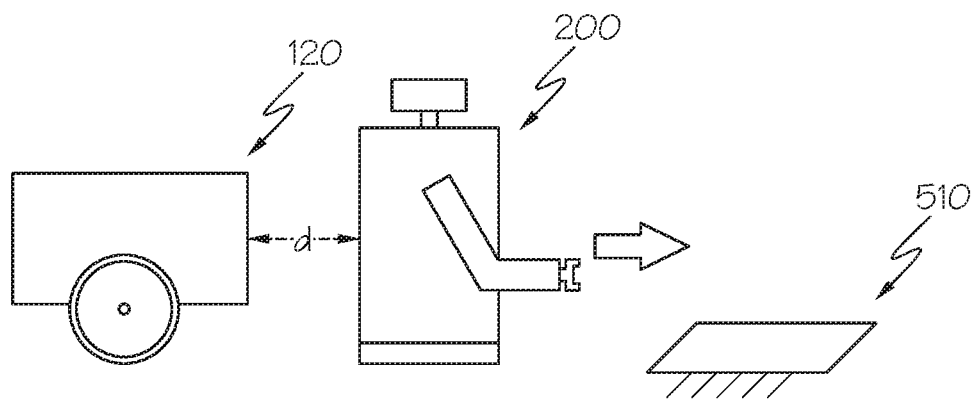
FIG. 5C depicts interaction between a guide robot with the power base of the modular wheelchair, according to one or more embodiments shown and described herein.
Figure 5D:
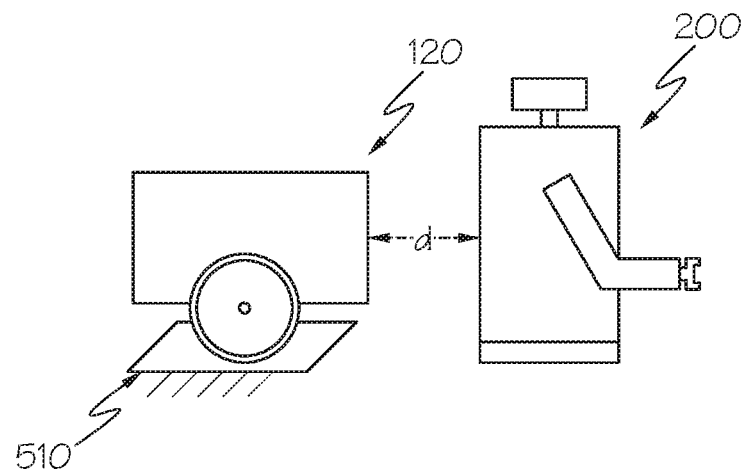
FIG. 5D depicts interaction between a guide robot with the power base of the modular wheelchair, according to one or more embodiments shown and described herein.

In step 440, the guide robot 200 implements coordinated movement with the power base 120 such that the power base 120 follows the guide robot 200 and is transferred to a predetermined area 510 as shown in FIGS. 5C and 5D. In embodiments, the guide robot 200 and the power base 120 may move in the same direction at the same speed such that the distance between the guide robot 200 and the power base 120 is maintained. For example, the controller 202 of the guide robot 200 determines the speed and direction of the guide robot 200 and operates the one or more electric motors 212 based on the speed and direction. At the same time, the guide robot 200 transmits the speed and direction information to the power base 120. The controller 140 of the power base 120 may control the one or more electric motors 150 based on the received speed and direction information. While FIGS. 5A through 5D depict the guide robot 200 paring with a single power base, in some embodiments, the guide robot 200 may pair with multiple power bases.

Figure 6A:
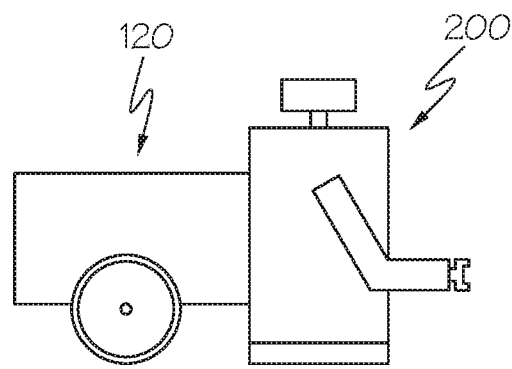
FIG. 6A depicts a guide robot mechanically coupled with one or more power bases, according to one or more embodiments shown and described herein.
Figure 6B:
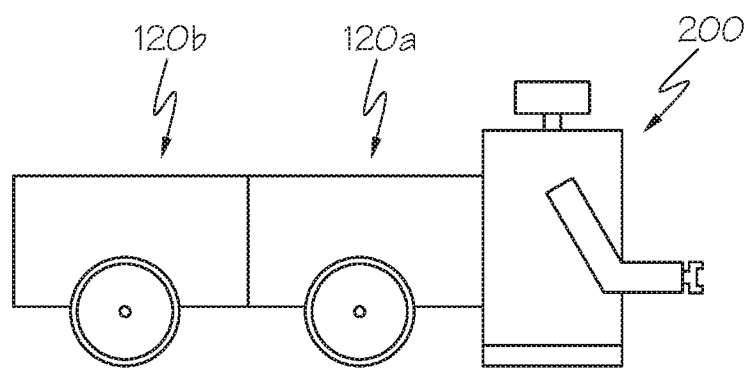
FIG. 6B depicts a guide robot mechanically coupled with one or more power bases, according to one or more embodiments shown and described herein.

FIGS. 6A and 6B depict a guide robot transporting one or more power bases, according to another embodiment shown and described herein. In FIG. 6A, the power base 120 is mechanically coupled to the guide robot 200. In embodiments, the guide robot 200 moves toward the power base 120 and couples with the power base 120 in response to determination that the upper component 110 of the modular wheelchair system 100 is detached from the power base 120.

The guide robot 200 and the power base 120 may be coupled using any mechanical coupling mechanism that couples the guide robot 200 and the power base 120. For example, the guide robot 200 may include female coupling section and the power base 120 may include a male coupling section that may be coupled with the female coupling section, or vice versa. In some embodiments, the guide robot 200 and the power base 120 may include magnetic components that attract each other to couple. Once the power base 120 is coupled to the guide robot 200, the guide robot 200 transfers the power base 120 to a predetermined area (e.g., a storage area, a charging area, etc.).

FIG. 6B depicts the guide robot 200 coupling with more than one power base. In FIG. 6B, the guide robot 200 is directly coupled with the power base 120a which is directly coupled with another power base 120b. In some embodiments, both the power base 120a and the power base 120b may be directly coupled to the guide robot 200. In embodiments, the guide robot 200 may determine that the power base 120a is detached from its upper component and the power base 120b is detached from its upper component, and directly couple with the power base 120a and the power base 120b in turn. While FIG. 6B depicts two power bases coupling with the guide robot 200, in some embodiments, more than two power bases may be coupled to the guide robot 200.

The embodiments described herein are directed to a system that includes a modular wheelchair system and a guide robot. The modular wheelchair system includes an upper component, and a power base configured to detachably couple to the upper component. The guide robot includes one or more sensors, one or more processors, one or more memory modules, and machine readable instructions stored in the one or more memory modules that, when executed by the one or more processors, cause the guide robot to: identify the power base based on output of the one or more sensors, determine whether the upper component is detached from the power base, pair with the power base in response to determination that the upper component is detached from the power base, and implement coordinated movement with the power base to transfer the power base to a predetermined area. With the present system, the user of the modular wheelchair system may continue to use the chair component of the modular wheelchair system. The power base of the wheelchair system may be delivered to a predetermined area (e.g., a storage area) by the guide robot, such that the user does not need help from another person to carry the power base. In addition, because the guide robot automatically guides the power base to a certain area, the power base virtually drives autonomously even without sensors and autonomous driving algorithm.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a modular wheelchair system, comprising:
      an upper component; and
      a power base configured to detachably couple to the upper component; and
   a guide robot communicatively coupled to the power base and configured to provide navigation data to the power base.

2. The system of claim 1, wherein the guide robot comprises:
   one or more sensors;
   one or more processors;
   one or more memory modules; and
   machine readable instructions stored in the one or more memory modules that, when executed by the one or more processors, cause the guide robot to implement coordinated movement with the power base to transfer the power base to an area.

3. The system of claim 2, wherein the machine readable instructions stored in the one or more memory modules, when executed by the one or more processors, cause the guide robot to:
   identify the power base based on output of the one or more sensors;
   determine whether the upper component is detached from the power base; and
   pair with the power base in response to determination that the upper component is detached from the power base.

4. The system of claim 2, wherein the machine readable instructions stored in the one or more memory modules cause the guide robot to:
   transmit moving direction and moving speed of the guide robot to the power base.

5. The system of claim 2, wherein the machine readable instructions stored in the one or more memory modules cause the guide robot to:
   maintain a distance between the guide robot and the power base while implementing coordinated movement.

6. The system of claim 2, wherein the machine readable instructions stored in the one or more memory modules cause the guide robot to:
   mechanically couple with the power base.

7. The system of claim 1, wherein the power base comprises one or more sensors configured to detect a detachment of the upper component from the power base.

8. The system of claim 2, wherein the machine readable instructions stored in the one or more memory modules cause the guide robot to:
   receive, from the power base, a signal indicating that the upper component is detached from the power base; and
   determine that the upper component is detached from the power base in response to the received signal.

9. The system of claim 2, wherein the machine readable instructions stored in the one or more memory modules cause the guide robot to:
   take a picture of the power base;
   process the picture of the power base; and
   determine that the upper component is detached from the power base based on the processed picture of the power base.

10. The system of claim 2, wherein the one or more sensors include at least one of a laser scanner, a capacitive displacement sensor, a Doppler Effect sensor, an eddy-current sensor, an ultrasonic sensor, a magnetic sensor, an optical sensor, a radar sensor, a sonar sensor, and a LIDAR sensor.

11. The system of claim 1, wherein the upper component comprises a user interface communicatively coupled to the guide robot.

12. A guide robot comprising:
    one or more processors;
    one or more memory modules; and
    machine readable instructions stored in the one or more memory modules that, when executed by the one or more processors, cause the guide robot to:
       pair with a power base of a modular wheelchair system; and
       transmit navigation data to the power base of the modular wheelchair system.

13. The guide robot of claim 12, further comprising one or more sensors,
    wherein the machine readable instructions stored in the one or more memory modules, when executed by the one or more processors, cause the guide robot to:
       identify the power base of the modular wheelchair system based on output of the one or more sensors;
       determine whether an upper component of the modular wheelchair system is detached from the power base;
       pair with the power base in response to determination that the upper component is detached from the power base; and
       implement coordinated movement with the power base to transfer the power base to an area.

14. The guide robot of claim 12, wherein the machine readable instructions stored in the one or more memory modules cause the guide robot to:
    pair with the power base using wireless communication.

15. The guide robot of claim 12, wherein the machine readable instructions stored in the one or more memory modules cause the guide robot to:
    transmit moving direction and moving speed of the guide robot to the power base.

16. The guide robot of claim 12, wherein the machine readable instructions stored in the one or more memory modules cause the guide robot to:
    maintain a distance between the guide robot and the power base while implementing coordinated movement.

17. A method for pairing a power base of a modular wheelchair system with a guide robot, the method comprising:
- identifying, by one or more sensors of a guide robot, a power base of a modular wheelchair system;
- pairing the guide robot with the identified power base by communication between a network interface hardware of the guide robot and a network interface hardware of the identified power base; and
- transmitting navigation data from the network interface hardware of the guide robot to the network interface hardware of the identified power base.

18. The method of claim 17, further comprising:
- determining whether an upper component of the modular wheelchair system is detached from the power base;
- pairing the guide robot with the identified power base in response to determination that the upper component is detached from the power base; and
- operating the guide robot to implement coordinated movement with the power base such that the power base is transferred to an area.

19. The method of claim 17, wherein operating the guide robot to implement coordinated movement with the power base comprises:
- transmitting moving direction and moving speed of the guide robot to the power base.

20. The method of claim 18, wherein determining whether an upper component of the modular wheelchair system is detached from the power base comprises:
- receiving, from the power base, a signal indicating that the upper component is detached from the power base; and
- determining that the upper component is detached from the power base in response to the received signal.

* * * * *